United States Patent
Van Dijk et al.

(10) Patent No.: US 6,831,948 B1
(45) Date of Patent: Dec. 14, 2004

(54) SYSTEM AND METHOD FOR MOTION COMPENSATION OF IMAGE PLANES IN COLOR SEQUENTIAL DISPLAYS

(75) Inventors: Roy Van Dijk, Eindhoven (NL); Jeffrey A. Shimizu, Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 595 days.

(21) Appl. No.: 09/365,209

(22) Filed: Jul. 30, 1999

(51) Int. Cl.[7] ................................................. H04N 7/12
(52) U.S. Cl. ................................................. 375/240.12
(58) Field of Search ....................... 375/240.01, 240.12; 348/443, 699; H04N 7/12

(56) References Cited

U.S. PATENT DOCUMENTS 4,862,267 A * 8/1989 Gillard et al. .............. 348/443
5,495,300 A * 2/1996 De Haan et al. ............ 348/699

* cited by examiner

Primary Examiner—Young Lee

(57) ABSTRACT

A system and method for motion compensation of color sequential displays, receiving a motion image data input, extracting an estimate of a motion of an image portion represented in said image data input with a motion estimator, and calculating, for a time instance of display of each image subframe of an image frame, a compensated representation for reducing display artifacts with a processor, wherein each subframe represents a different aspect of the image frame. The subframes are preferably different color planes of the image frame. The processor preferably performs a bilinear interpolation where the compensated image boundary does not fall on a display pixel boundary. The motion compensation algorithm is preferably robust in the face of erroneous motion vectors. The system and method is advantageously used in single panel liquid crystal display projection systems, although the techniques are applicable to various image display technologies.

15 Claims, 6 Drawing Sheets

SYSTEM AND METHOD FOR MOTION COMPENSATION OF IMAGE PLANES IN COLOR SEQUENTIAL DISPLAYS

FIELD OF THE INVENTION

The present invention relates to the field of color image displays, and more particularly to color displays in which the color image planes are separately updated or displayed. The invention also relates to compensation of motion images for artifacts introduced by a discrete time representation thereof.

BACKGROUND OF THE INVENTION

Color image displays are of two general types. In a first type, exemplified by a typical direct-view cathode ray tube color display, all color image components are displayed simultaneously. Thus, an image model, e.g., a CCIR-601 signal, defines the luminance and chrominance of each image pixel at a particular time. The motion image is therefore presented as a time sequence of color image frames.

In a second type of color image display, color image planes are displayed sequentially. This type of system is employed, for example, in certain single panel image projection systems, in which light of various colors sequentially illuminates a common spatial light modulator. The spatial image modulator, therefore, modulates the intensity of each respective color component of a pixel sequentially and independently, which is perceived as a color motion image.

Sequential color displays work well as long as one pixel is being observed during an entire frame time. When a moving object is present, the eyes are focussing on this object, and the eyes start tracking the motion. The color breakup artifact that an observer notices at that moment is caused due to tracking of the motion by the eyes, i.e. the eyes follow a moving object by rotating the head and eyes while keeping this object focussed on the same position on the retina.

Color sequential displays display the Red, Green, Blue (RGB) colors alternating during a frame time, as represented in FIG. 1. This frame time might have a small delay for each successive row, depending on the way the color sequential illumination is implemented, but this time delay is generally considered negligible. The image pixels are observed at different time moments within a frame period, and thus might display different video data for the RGB colors other than the intended one. If this happens when the video data of these pixels changes, at that moment a color break-up artifact is visible.

JP 08-123355 A, published May 17, 1996, relates to a motion compensation system for a plasma display panel. In this system, the image motion artifact caused by the tracking of the human eye of motion of a displayed object between successive frames, in a display system having pulse modulated gray scale generation, representing a plurality of image subframes differing in brightness, is corrected by calculating object motion and moving the object within the image for correction at the time of display.

The following references are hereby incorporated herein by reference in their entirety:

W. Bruls, A. van der Werf, R. Kleihorst, T. Friedrich, E. Salomons and F. Jorritsma, "A single-chip MPEG-2 encoder for consumer storage applications" *Digest of the ICCE,* 1997, Chicago, pp. 262–263.

G. de Haan and H. Huijgen, "Motion estimation for TV picture enhancement", in *Signal Processing of HDTV III,* (H. Yasuda and L. Chiariglione, eds.), Elseviers Science Publishers B.V., 1992, pp. 241–248.

G. de Haan, J. Kettenis, and B. Deloore, "IC for motion compensated 100 Hz TV, with a smooth motion moviemode", *IEEE Transactions on Consumer Electronics,* vol. 42, May 1996, pp. 165–174.

G. de Haan, P.W.A.C. Biezen and O. A. Ojo, "An Evolutionary Architecture for Motion-Compensated 100 Hz Television," in *IEEE Transactions on Circuits and Systems for Video Technology, Vol.* 5, No. 3, June 1995, pages 207–217.

"Motion—compensated picture signal interpolation", U.S. Pat. No. 5,495,300, Inventors: G. de Haan, P. Biezen, A. Ojo, and H. Huijgen.

G. de Haan, P. Biezen, H. Huijgen, and O. Ojo, "True motion estimation with 3-D recursive search blockmatching," *IEEE Transactions on Circuits and Systems for Video Technology, vol.* 3, No. 5, October 1993, pp. 368–388.

G. de Haan, P.W.A.C. Biezen, H. Huijgen and O. A. Ojo, "Graceful Degradation in Motion-Compensated Field-Rate Conversion" in *Proceedings of the International Workshop on HDTV,* Ottawa, Canada, 1993, pages 249–256.

JP 06-46358, 18.2.1994, "Liquid Crystal Driving Device", Masao Kawamura. (Moving image emphasis system).

WO 96/35294, "Motion Compensated Filtering", 7 Nov. 1996, Timothy Borer (Motion compensated filtering of interlace video). See also U.S. Pat. Nos. 5,335,194; 4,862,266; and 4,862,267;

SUMMARY OF THE INVENTION

The present inventors have therefore determined that the perceived artifacts evident in a color sequential display producing an image of a moving object may be addressed by separately motion compensating the objects represented within the respective color planes based on the time of display. This compensation scheme determines motion vectors for areas or objects within an image stream, predicts (e.g., by interpolating or extrapolating) the object position for respective times of presentation of respective color subframes, and sequentially displays the respective color planes representing the areas or objects at the predicted position.

Artifacts may be evident any time a dynamic pixel image is displayed at a time other than the theoretical timing of presentation. Thus, while the artifact is especially apparent in color sequential RGB displays driven using the nominal RGB color separation of a sequence of composite frames of a video signal, it may also occur in certain other instances, for example in systems employing other color plane definitions or color space representations. Therefore, it is understood that the invention is not limited to the modification of color plane images of RGB sequential color displays to correct for the non-coincidence of the actual time of display with the theoretical time of display with respect to the motion of objects within a frame. In fact, the invention encompasses the modification of image subframe data for display, especially where the image subframes represent different components of the image frame and are presented at different respective times than the nominal frame time, by reformulating the discrete time image subframes by distinguishing image object components having apparent independent motion, and resynthesizing an image subframe with a modified relationship object of the respective object components having independent motion. Preferably, this resynthesis is for the purpose of correcting a timing shift between the actual time of display of the image subframe including the object component and the theoretical time for display based on the original scene. The present invention also provides a system and method for calculating and presenting the image corrections with sub-pixel precision.

The prediction of object or area position may be of any known type, although interpolation or extrapolation of first order (velocity) is preferred. Higher order predictions, for example, require additional information, and may-therefore increase image presentation latency and/or memory requirements. While known motion estimation techniques, such as those employed in MPEG-2 encoders, may be employed, model based systems may also be employed, for example MPEG-4 or VRML-type systems, to define the object motion.

Motion estimation systems typically operate on image frames to analyze sequential changes. Where analogous regions are identifiable between sequential frames, typically confined to a search area, the displacement of the region may be encoded as a motion vector. Therefore, this information is often used in motion image compression, wherein the identification of an image block and its motion vector is transmitted, instead of the image block itself. According to the present invention, similar techniques may be used, as is well known in the art. However, portions of a moving foreground object may cover or uncover the background image. In the case of uncovering of background, the background image need be synthesized. In the case where an image interpolation is employed, the background image may be predicted based on the subsequent image frame. In the case of an extrapolation (i.e., use of past frame data only), this information may be lacking. Therefore, in spite of the use of intelligent algorithms, artifacts may be generated in this case as well.

According to the present invention, it is important to encode the motion vectors to represent the movement of objects represented in the image, with priority given to the largest motion vectors, rather than the greatest opportunity for image compression.

The implementation of a processor for computing motion vectors is well known in the art, and need not be described herein in detail. Typically, the motion vector compensation system will include a powerful general purpose computer or workstation, or a dedicated digital image processing device, such as an appropriately programmed Royal Philips Electronics Trimedia device.

Motion estimation analyzes the speed of the video frame content and the motion vectors are determined. Motion compensation, on the other hand, uses these motion vectors to re-align (or interpolate) the three RGB colors according to these motion vectors. In FIG. 2, the motion artifact and the result of motion compensation are shown. These artifacts occur generally in sequential color display systems, although an analogous artifact exists in Plasma Display Panels (PDPs) and Digital Mirror Devices (DMDs).

According to the present invention, in color field compensation, the color fields are aligned on the motion vectors (with the remaining rounding errors). In color sequential displays, the colors are aligned on the motion vectors with a remaining rounding error, or more accurately with the preferred bilinear interpolation technique. This is possible in color sequential displays, since the entire amplitude for one color is being displayed in one color subframe, in contrast to color field (PDP) gray scaling. According to an aspect of the invention, bit splitting techniques, frame rate increasing techniques, and motion compensation may be simultaneously employed, by controlling each subfield and each color plane individually. For example, when using traditional bit splitting of the most significant bit (MSB), when making a correction of ne-half of the MSB subfields, the other half MSB subfield is also "falsely" corrected. According to the present invention, two bits are available for controlling each half of the MSB subfield individually.

Therefore, it is an object according to the present invention to provide a system and method for image compensation in an image display device in order to avoid various motion image artifacts, especially image color break-up and improve a perceived imaged quality.

It is a further object of the invention to provide a color sequential image display processor which reduces color break-up by estimating an optimal position of an image representation of a moving object or area based on a time of presentation and predicted or estimated motion characteristics.

It is also an object according to the present invention to provide a system for motion compensation of color sequential displays.

Such a system comprises means for estimating motion from the input image data; means for calculating a motion compensated luminance value from the input video data, valid at a temporal instance that corresponds to a gravity center of each color subframe; and means for calculating the value for all color subframes leading to correct perception of the motion for the combination of the color subframes. The calculation of the correct color subframe video value is preferably done by bilinear interpolation; alternately, the calculation of the correct color subframe video value is done by selecting the closest pixel to choose the video data. The motion compensation means preferably includes a robust interpolation method reducing the effect of erroneous motion vectors, the robust interpolation method being selected from one or more of median filtering and order statistical filtering. Advantageously, a decision of a reference time for the most important color subframe, e.g., green, is taken at a moment in time for which no motion compensation interpolation, or compensation over the shortest possible distance from the original picture, is required.

It is also an object according to the present invention to provide a method for motion compensation of color sequential displays.

Such a method comprises the steps of:
(a) processing received image data comprising frames (2), each frame defining a plurality of subframes (4, R, G, B), each subframe representing a different component of the image frame (R, G, B) for display at different respective times ($T_R$, $T_G$, $T_B$) within a frame period;
(b) estimating a motion of an image portion represented in said frames of image data input (3); and
(c) motion compensating the image portion based on the estimated motion, with respect to a respective time instance of display of at least one of said subframes thereof (5), thereby reducing display artifacts.

These and other objects and features of the present invention will become more fully apparent from the following description and appended claims taken in conjunction with the accompanying drawings.

BRIEF DESCRIPTION OF THE DRAWINGS

For a better understanding of the invention, reference is made to the drawings, which are to be taken in conjunction with the detailed specification to follow.

DETAILED DESCRIPTION OF THE PREFERRED EMBODIMENTS

Figure 1:
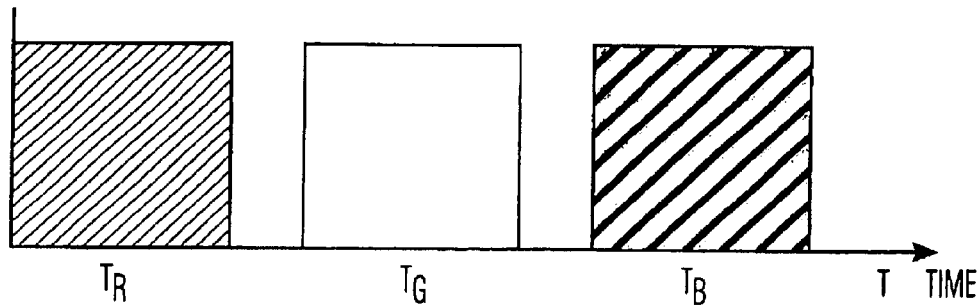
FIG. 1 shows a subframe division for a color sequential device.

The invention will now be described by way of the drawings, in which corresponding reference numerals indicate corresponding structures in the figures.

Figure 2A:
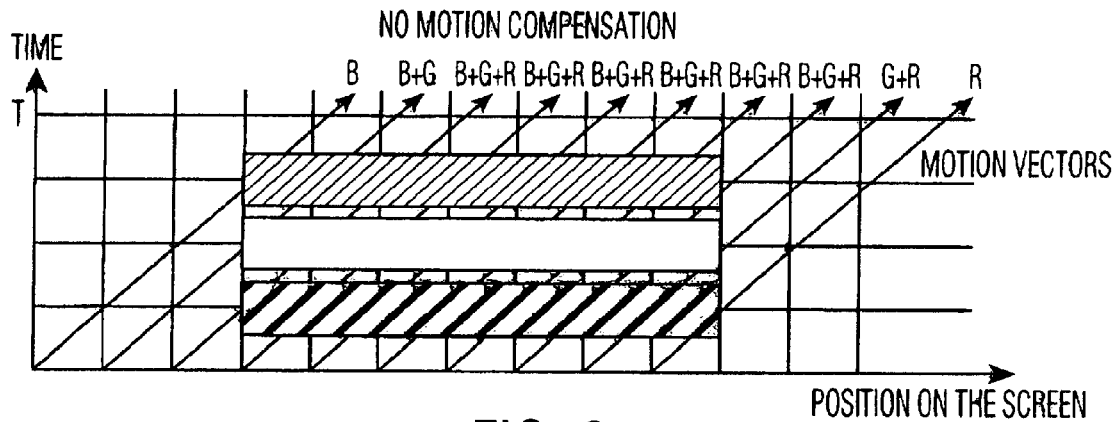
FIGS. 2A and 2B shows the nature of the motion artifact and motion compensation thereof, respectively.
Figure 2B:
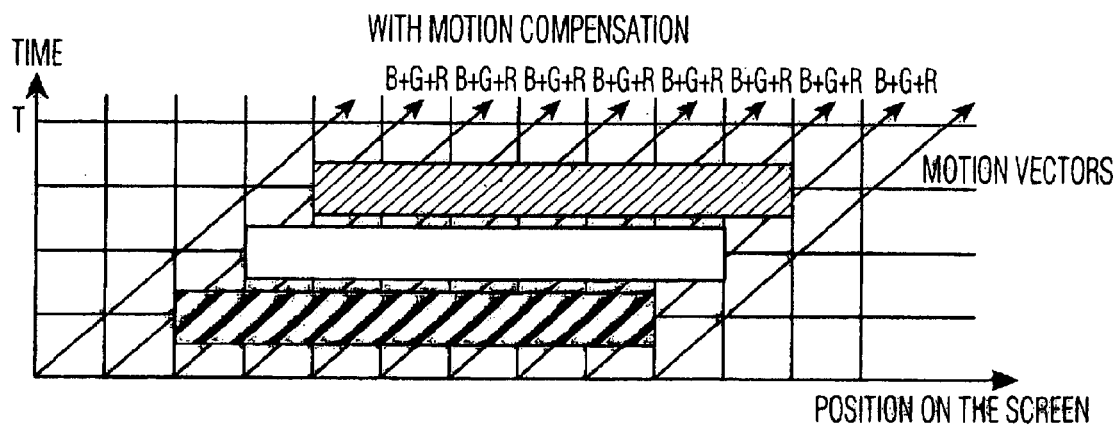

As shown in FIG. 2a, a white (R+G+B) vertical bar 6 pixels wide is moving over the screen over a black background with a speed of 3 pixels per frame. The observer's eyes track the motion according to the speed and direction of the motion vectors. At the top of the motion vectors, the colors have been shown that are observed when tracking this motion. At the leading edge of the bar, a blue and mix of blue and green pixel is being observed, while at the trailing edge a mix of green and red, and a red pixel can be seen. Motion compensation attempts to project the RGB data from one pixel on the motion vector. The result is that the same vertical bar is also shown in FIG. 2b, and in this case only the white bar is seen.

The observed luminance is the sum of the observed color subframes, SF, thus, $$L(k) = \sum_{SF} \qquad (1)$$

and is in this case equal to:

$$L(\overline{k}) = R(\overline{k}) + B(\overline{k}) + G(\overline{k}) \qquad (2)$$

For a moving object with speed, $\overline{v}=(v_x, v_y)$, that is being tracked by the observers eyes, the contributions of RGB are:

$$R(\overline{k}) = r(\overline{k} + d_R(\overline{k}))$$

$$G(\overline{k}) = g(\overline{k} + d_G(\overline{k}))$$

$$B(\overline{k}) = r(\overline{k} + d_R(\overline{k})) \qquad (3)$$

with $R(\overline{k}), G(\overline{k}), B(\overline{k})$ being the RGB colors that are observed simultaneously on one position in the eye, $r(\overline{k}), g(\overline{k}), b(\overline{k})$ being the input RGB video data, $\overline{k}=(x,y)$ the position on the screen and $\overline{d}_R, \overline{d}_G, \overline{d}_B$, the distance over which the RGB colors for an observer seem to be displaced, according to Equation 4:

$$\overline{d}_R = \overline{v} \cdot (t_R - t_0)$$

$$\overline{d}_G = \overline{v} \cdot (t_G - t_0)$$

$$\overline{d}_B = \overline{v} \cdot (t_B - t_0) \qquad (4)$$

with $\overline{v}$, the motion vector at position $\overline{k}$, $t_0$ the reference time within a frame and $t_R, t_G, t_B$, the emission time of the R, G and B colors.

These equations only represent the displacement of an object with velocity v during a time $t_R - t_0$ (for red).

For a static object in a scene i.e., the horizontal speed $v_x=0$ and vertical speed, $v_y=0$ this results in $L(\overline{k})=r(\overline{k})+b(\overline{k})+g(\overline{k})$, which exactly equals the input RGB video data. When the speed is not equal to 0, the observed luminance is the sum of the RGB data, but shifted by the motion vector and the time difference between the emission moment of a color and the reference time.

The observed mis-convergence in the colors during motion tracking is the distance over which the video data seems to be shifted according to the Equations 4.

This mis-convergence relative to a position on the screen $\overline{k}$ can be expressed as:

$$\overline{k} + \overline{d}_R$$

$$\overline{k} + \overline{d}_G$$

$$\overline{k} + \overline{d}_B \qquad (5)$$

for red, green, and for blue respectively, and are the positions on the screen that are being observed during motion tracking and the emission moments of the RGB colors.

If the reference time, $t_0$, is taken equal to the moment of the emission of green, $t_G$, the mis-convergence can be calculated, and results in: $\overline{k}+\overline{d}_R$ for red, $\overline{k}$ for green and $\overline{k}+\overline{d}_B$ for blue.

To be precise, when a position $\overline{k}$ on the screen is being observed, only red and blue have a mis-convergence of $\overline{d}_R$ and $\overline{d}_B$, which is exactly the displacement of the eyes over the screen due to the speed $\overline{v}$ and the emission time moments of red and blue respectively, relative to green. It is convenient to take green as a reference, since in that case there is no mis-convergence for low speeds, furthermore, an error in the motion vector only leads to a smaller error in the colors red and blue. The human eye is less sensitive for a positional error in blue, which is a reason not to choose blue as a reference time. The time difference between the reference time and the colors red and blue is smaller than when the reference time is chosen to be equal to the start of a frame. Errors in the motion vectors lead in that case to a larger mis-convergence, especially for blue.

For compensation of the mis-convergence of the colors, it is attempted to make the observed positions on the display, under tracking of an object (in FIG. 2, the directions of the motion vectors), equal for all three RGB colors. Thus, by mis-aligning of the video data for the RGB colors with respect to each other, motion compensation can be obtained.

The mis-alignment for red, $\overline{p}_R$, green, $\overline{p}_G$, and blue, $\overline{p}_B$ at position $\overline{k}$ on the screen, to compensate for this error can be calculated according to:

$$\overline{k}+\overline{d}_R+\overline{p}_R = \overline{k}+\overline{d}_G+\overline{p}_G = \overline{k}+\overline{d}_B+\overline{p}_B \qquad (6)$$

If the moment of emission of green equals the reference time, this leads to:

$$\overline{k}+\overline{d}_R+\overline{p}_R = \overline{k} = \overline{k}+\overline{d}_B+\overline{p}_B \qquad (7)$$

Thus, to perceive a good motion compensated image during tracking, the mis-alignment of red and green for an object with velocity $\overline{v}$ must be:

$$\overline{p}_R = -\overline{v} \cdot (t_R - t_G)$$

$$\overline{p}_B = -\overline{v} \cdot (t_B - t_G)$$

Figure 3:
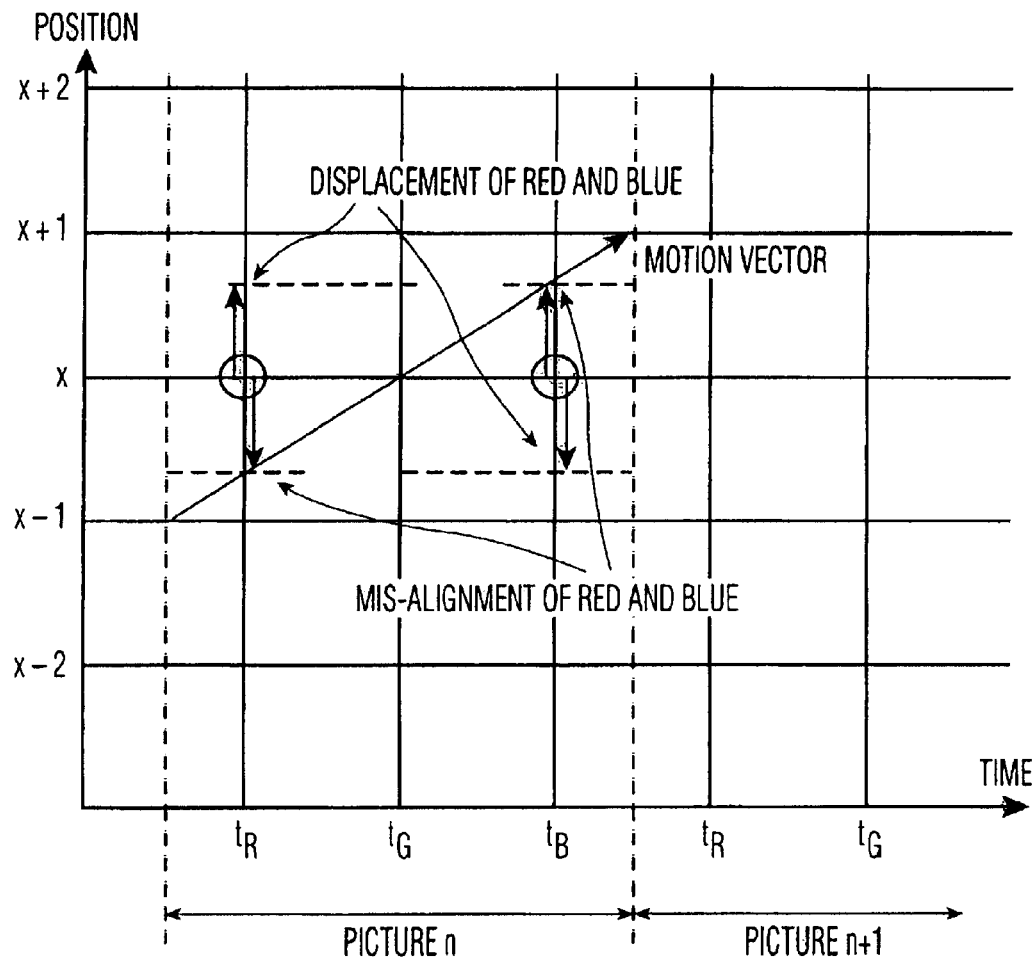
FIG. 3 shows the misalignment of the RGB video data to obtain motion compensation.

In FIG. 3, the displacement of red and blue has been indicated, and the mis-alignment that is required to obtain motion compensation for a speed of 2 pixels per frame.

FIG. 3 also illustrates a particular problem which is seen in a matrix display panel. The video data for red and blue must be displayed on the panel at a position in between two pixels, i.e. for red it is a position of ⅔rd from x and ⅓rd from x−1, and for blue it is at ⅔rd from x and ⅓rd from x+1. This, however, is a position at which no actual pixel boundary is present, and therefore it is not possible to show the edge at exactly at this location.

Two solutions are available. A first solution is to round the misalignment value of red, $\overline{p}_R$ and blue, $\overline{p}_R$ to the nearby pixels at a position $\overline{k}$ on the screen.

In that case Equation 8 becomes:

$$\bar{k}+\text{Round}(\overline{p_R})=\bar{k}-\text{Round}(\bar{v}\cdot(t_R-t_G))$$

$$\bar{k}+\text{Round}(\overline{p_B})=\bar{k}-\text{Round}(\bar{v}\cdot(t_B-t_G))$$

with $$\text{Round}(\bar{x})=\text{Round}(x,y)=(\text{Round}(x),\text{Round}(y)) \qquad (10)$$

Figure 4A:
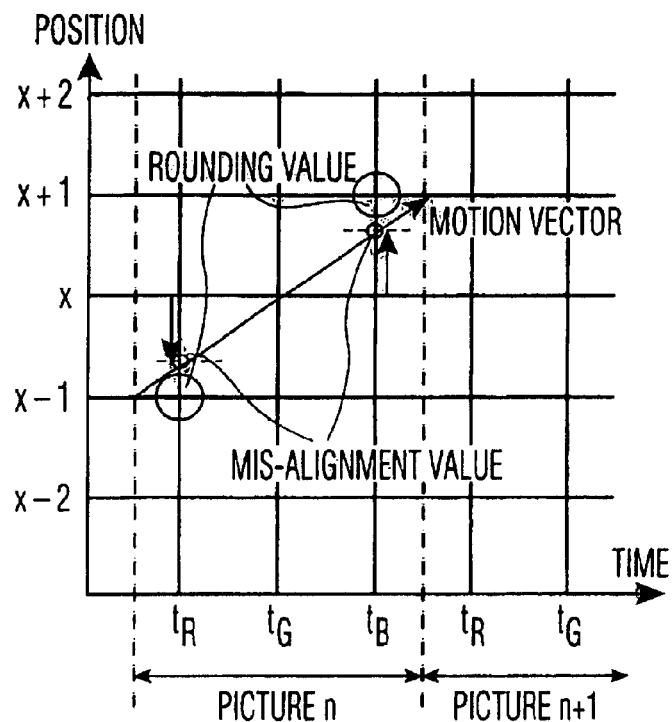
FIGS. 4A and 4B show, respectively, a subframe reconstruction by rounding and by interpolation for a color sequential device.

This condition is shown in FIG. 4A.

In this case, an alignment error of at most ½ pixel remains in the colors red and blue, which is generally considered acceptable.

Figure 4B:
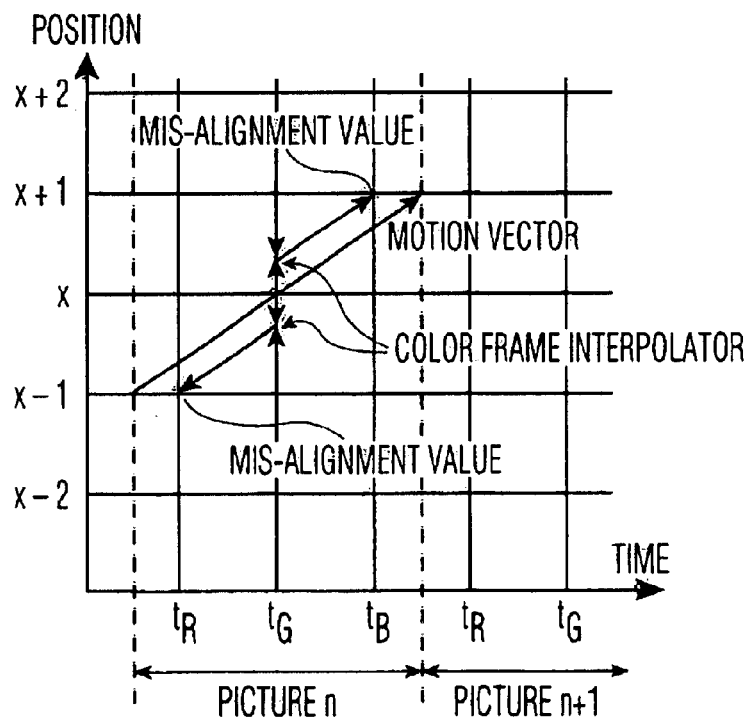

The other solution is to use bilinear interpolation to reconstruct the video data for one color according to FIG. 4B.

The video data for the color subframe SF that is determined is interpolated in such a way that after the misalignment, the video data transition occurs exactly on the matrix grid.

First, the rounded value is determined according to Equation 9, after that the fractions $\bar{f}_R$ and $\bar{f}_B$ are determined for the bilinear interpolator for red and blue respectively, according to Equation 11.

$$\bar{f}_R=\text{Round}(\overline{p_R})-\overline{p_R}=\text{Round}(\bar{v}\cdot(t_R-t_G))-\bar{v}\cdot(t_R-t_G)$$

$$\bar{f}_B=\text{Round}(\overline{p_B})-\overline{p_B}=\text{Round}(\bar{v}\cdot(t_B-t_G))-\bar{v}\cdot(t_B-t_G) \qquad (11)$$

Figure 5:
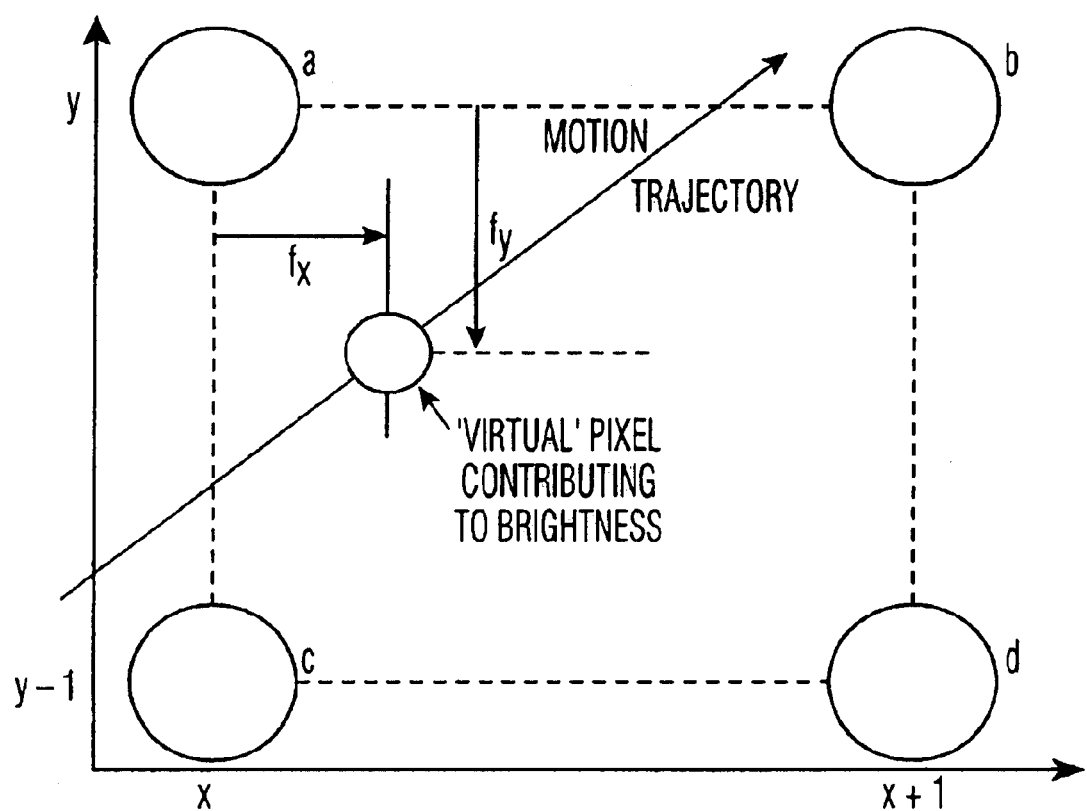
FIG. 5 shows bilinear interpolation of the sub-frame value SF from the neighboring pixels at an image position.

In FIG. 5, a representation of the bilinear interpolation is shown.

In general, the bilinear color subframe interpolation for a color subframe SF can be written as:

$$a = SF(\vec{k}) \qquad b = SF\left(\vec{k}+\begin{pmatrix}1\\0\end{pmatrix}\right) \qquad (12)$$

$$c = SF\left(\vec{k}+\begin{pmatrix}0\\1\end{pmatrix}\right) \qquad d = SF\left(\vec{k}+\begin{pmatrix}1\\0\end{pmatrix}+\begin{pmatrix}0\\1\end{pmatrix}\right)$$

The value of $$SF\left(\vec{k}+\begin{pmatrix}f_x\\f_y\end{pmatrix}\right)$$

is calculated as:

$$SF(\bar{k})=(1-f_x)((1-f_y)a+f_yc)+f_x((1-f_y)b+f_yd) \qquad (13)$$

with $f_x$ and $f_y$ being the positive sub-pixel fraction in horizontal and vertical direction, respectively, resulting from motion.

Thus, the new video data for color subframe SF is determined by:

$$SF(\vec{k}+\text{Round}(\overline{p_{SF}}))\ D_{SF}(\vec{k}+\overline{f_{SF}}) \qquad (14)$$

whereby the new video data of color subframe SF is misaligned by Round($\overline{p_{SF}}$) (new position on the screen), and is interpolated from the original color subframe video data $D_{SF}$. The color subframe SF can be either red or blue.

This bilinear interpolation is thus similar to typical antialiasing schemes, which provides a partial brightness distribution between pixels surrounding the theoretical location in order to avoid edge artifacts. Therefore, it is also understood that other techniques known in the field of image antialiasing may be applied to this system. In fact, according to the present invention, edges or edges of motion compensated objects may be processed to enhance the presented image, for example by increasing contrast, in order to improve a perceived image quality and reduce artifacts.

The Motion Estimator

Rather than calculating all possible candidate motion vectors, the recursive search block-matcher takes spatial and/or temporal "prediction vectors" from a 3-D neighborhood, and a single updated prediction vector. This implicitly assumes spatial and/or temporal consistency. The updating process involves update vectors added to either of the spatial prediction vectors.

Assuming blocks of height Y, width X, and center $\vec{X}$, we define a candidate set CS($\vec{X}$,t), from which, at time t, the block-matcher selects its result vector:

$$CS(\vec{X},t) = \left\{ \begin{array}{l} \left(\vec{D}\left(\vec{X}-\begin{pmatrix}X\\Y\end{pmatrix},t\right)+\vec{U}_1(\vec{X},t)\right) \\ \left(\vec{D}\left(\vec{X}-\begin{pmatrix}-X\\Y\end{pmatrix},t\right)+\vec{U}_2(\vec{X},t)\right) \\ \left(\vec{D}\left(\vec{X}-\begin{pmatrix}0\\2Y\end{pmatrix},t-T\right)\right) \end{array} \right\} \qquad (15)$$

where T is the picture period, and the update vectors $\vec{U}_1(\vec{X},t)$ and $\vec{U}_2(\vec{X},t)$ are block-alternatingly equal to the zero vector ($\vec{0}$), or taken from a limited fixed integer update set, in our case:

$$US_i(\vec{X},t) = \left\{ \begin{array}{cccc} \vec{0} & & & \\ \vec{u}_y & -\vec{u}_y & -\vec{u}_x & -\vec{u}_x \\ 2\vec{u}_y & -2\vec{u}_y & 3\vec{u}_x & -3\vec{u}_x \end{array} \right\} \qquad (16)$$

where we introduce $$\vec{u}_x = \begin{pmatrix}1\\0\end{pmatrix} \text{ and } \vec{u}_y = \begin{pmatrix}0\\1\end{pmatrix}.$$

To realize sub-pixel accuracy, the update set of equation (9) is extended with fractional update values. An overall quarter picture element (pel) resolution is achieved by adding the following fractional update vectors to the update set:

$$US_i(\vec{X},t) = \left\{ \frac{1}{4}\vec{u}_y \quad -\frac{1}{4}\vec{u}_y \quad \frac{1}{4}\vec{u}_x \quad -\frac{1}{4}\vec{u}_x \right\} \qquad (17)$$

The estimator chooses its output motion vector $\vec{D}(\vec{X},t)$ from the candidates, using the mean absolute difference (MAD) criterion. Because of the small number of candidate vectors that have to be evaluated, the method is very efficient, i.e. only a few mean absolute differences have to be calculated. Furthermore, due to the inherent smoothness constraint, it yields very coherent vector fields that closely correspond to the true-motion of objects.

The Motion Compensated Interpolation

Motion compensation can be very straightforward, i.e. merely fetch the luminance from a position shifted over the estimated motion vector. Although simple, such a simple method shows rather strong artifacts in case of erroneous vectors. Such vector errors cannot always be prevented, as some temporal effects in an image sequence cannot adequately be described in terms of translations. Therefore, a robust motion compensation algorithm should preferably be applied. Robust here is meant in a sense that the algorithm includes protection mechanisms that prevent extreme degradations in the event of erroneous motion vectors.

To that end, rather than just shifting, or slightly better, averaging the motion compensated luminance values from the neighboring pictures:

$$F_a(\vec{x}, t-\alpha) = \frac{1}{2} \cdot \left( \alpha F(\vec{x} + \alpha \vec{D}, t) + (1-\alpha) F(\vec{x} - (1-\alpha)\vec{D}, t-T) \right); \quad (18)$$

$$0 \leq \alpha \leq T$$

which is a more common procedure, a robust algorithm according to the present invention performs a non-linear filtering of motion compensated and non-motion compensated pixels:

$$F_{mc}(\vec{x}, t-) = Med\{F(\vec{x} + \alpha \vec{D}, t), F(\vec{x} - (1-\alpha)\vec{D}, t-T), F_{av}(\vec{x}, t)\} (19)$$

where $F_{av}$ as defined as:

$$F_{av}(\vec{x}, t) = \frac{1}{2} \cdot (F(\vec{x}, t) + F(\vec{x}, t-T)) \quad (20)$$

and Med is the median function, defined as:

$$Med(A, B, C) = \begin{cases} A, & (B < A < C) \vee (C < A < B) \\ B, & (A \leq B \leq C) \vee (C \leq B \leq A) \\ C, & \text{otherwise} \end{cases} \quad (21)$$

Of course, it is understood that other known robust algorithms for filtering a predicted boundary position and/or centroid position may be employed.

Figure 6:
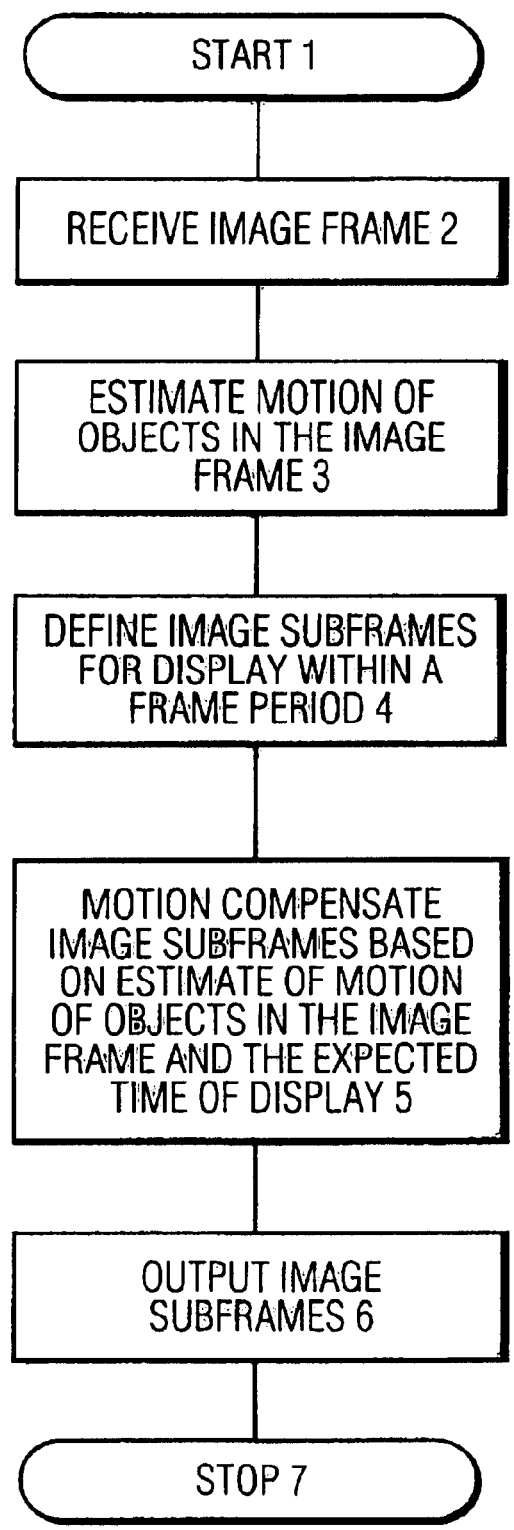
FIG. 6 shows a flowchart of a method according to the present invention.

The image processor according to the present invention may be implemented with a highly integrated processor, such as the Philips Electronics TriMedia processor, which, for example, may provide other functions, such as digital video decoding (e.g., MPEG-2), audio decoding and processing, and the like. The digitized image signal frames are received in yuv color space and converted to RGB color space. As shown in FIG. 6, a set of successive frames are received 2, and the motion of image objects within between image frames is estimated 3. Generally, regions with the fastest moving objects require compensation more than regions with slowly moving objects, so that the image is, for example, processed in order of magnitude of computed motion vector, (or density of image change between successive frames) within the available processing time. The RGB color subframes are then defined at an instant in time 4 motion compensated 5 based on the respective time of display, and output 6 in known manner.

Figure 7:
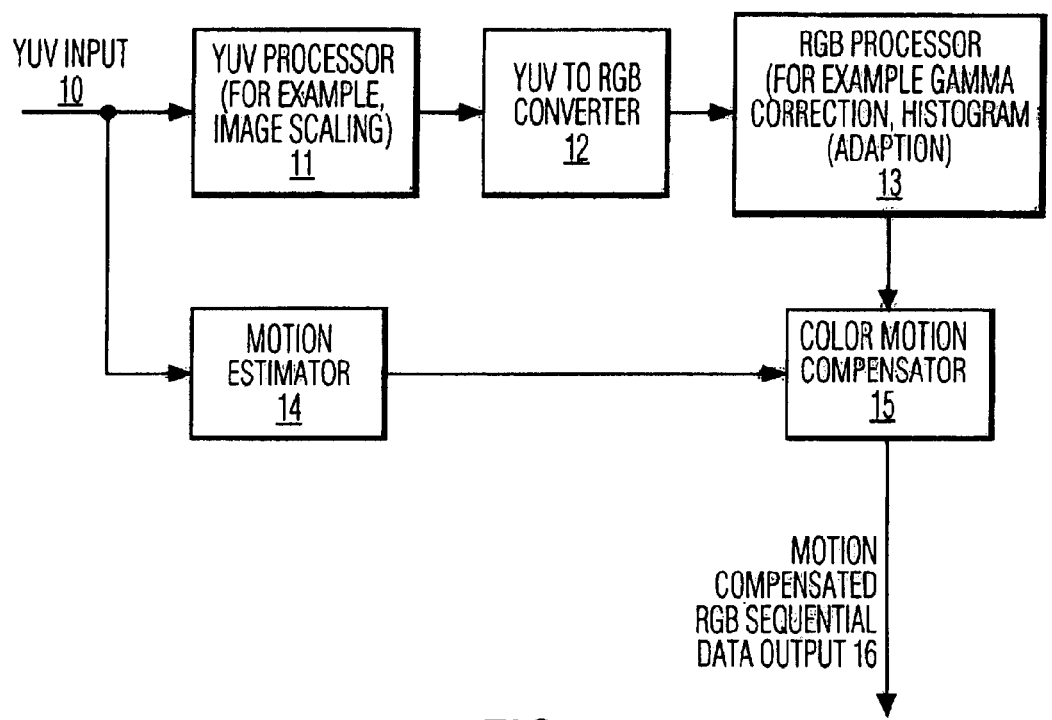
FIG. 7 shows a block diagram of a system according to the present invention.

As shown in FIG. 7, YUV image data is input 10 into both a Yuv processor 11, which, for example, performs image scaling, and a motion processor or motion estimator 14, which analyzes the YUV image data for significant image regions with common motion vectors. The processed YUV image data is then converted to a pixel representation in RGB color space in YUV to RGB converter 12. The RGB image in the form of RGB subframe information is then processed in RGB processor 13, which performs, for example, gamma correction, histogram adaption, etc. The output processor or color motion compensator 15 receives the motion compensation information in the form of processed RGB date from the motion processor or motion estimator 14, and the separated, processed RGB subframe information from the RGB processor 13, and compensates the image of each respective RGB subframe, based on a prospective time of presentation, to reduce the perceived motion artifact, by means of motion compensated RGB sequential data 16.

The output processor 15 may also provide other functions, for example apparent frame rate increasing, e.g., by inserting a greater number of color subframes within a frame period than the minimum three for an RGB representation, each of which is preferably compensated for its respective time of presentation.

In practice, all of these functional elements may be implemented as software-defined constructs within a dedicated processor, such as the Royal Philips Electronics Tri-Media processor.

While the above detailed description has shown, described and pointed out the fundamental novel features of the invention as applied to various embodiments, it will be understood that various omissions and substitutions and changes in the form and details of the system and method illustrated may be made by those skilled in the art, without departing from the spirit of the invention. Consequently, the full scope of the invention should be ascertained by the appended claims.

What is claimed is:

1. A method for motion compensation of displays, comprising:
   (a) processing received image data comprising frames (2), each frame defining a plurality of subframes (4, R, G, B), each subframe representing a different component of the image frame (R, G, B) for display at different respective times ($T_R$, $T_G$, $T_B$) within a frame period;
   (b) estimating a motion of an image portion represented in said frames of image data input (3); and
   (c) motion compensating the image portion based on the estimated motion, with respect to a respective time instance of display of at least one of said subframes thereof (5), thereby reducing display artifacts.

2. The method according to claim 1, wherein each respective subframe corresponds to a different color plane, of a respective frame, for display in a color-sequential manner at different times within the frame period.

3. The method according claim 1, wherein the subframe of the motion compensated image portion is translated into a corrected subframe having modified pixel values by bilinear interpolation.

4. The method according to claim 1, wherein the subframe of the motion compensated image port is translated into a corrected subframe having modified pixel values by defining a portion boundary at a closest color plane pixel.

5. The method according to claim 1, wherein the motion compensation employs a robust interpolation, reducing the effect of erroneous motion vectors, said robust interpolation being selected from one or more of median filtering and order statistical filtering.

6. The method according to claim 1, in which a reference time for a dominant subframe is defined at a moment in time for which minimal motion compensation interpolation is required.

7. The method according to claim 1, further comprising the step of calculating the motion compensation for at least two image subframes, correcting perception of the motion for the combination of the image subframes.

8. A system for motion compensation of displays, comprising:
   (a) a motion image data input 10 comprising frames, each of said frames defining a plurality of subframes for presentation within a frame period, each subframe representing a different component of the image frame;
   (b) a motion estimator for extraction an estimate of motion of an image portion represented in said frames of image data input; and (c) a processor for calculating, for respective time instances of display of said plurality of subframes of an image frame, a compensated representation for at least one of said subframes, thereby reducing display artifacts.

9. The system according to claim 8, wherein each of said subframes represents a color plane of said image frame.

10. The system according to claim 8, further comprising an output processor for converting said compensated representation into a pixel representation, wherein said pixel representation is derived by bilinear interpolation.

11. The system according to claim 8, further comprising an output processor for converting said compensated representation into a pixel representation, wherein said pixel representation is derived by selecting a closest pixel boundary to an image portion boundary.

12. The system according to claim 8, wherein said processor produces said compensated representation using a robust interpolation algorithm, reducing the effect of erroneous motion vectors, said robust interpolation algorithm being selected from one or more of median filtering and order statistical filtering.

13. The system according to claim 8, wherein a motion estimation reference time is selected for one image subframe for which minimal motion compensation interpolation is required.

14. The system according to claim 13, wherein the selected image subframe comprises a green color plane of the image frame.

15. The system according to claim 8, wherein said processor calculates the compensated representation for at least two image subframes leading to correct perception of the motion for the combination of the image subframes.

* * * * *